(12) United States Patent
Simpson

(10) Patent No.: US 8,119,025 B2
(45) Date of Patent: Feb. 21, 2012

(54) ANTI-ICING COMPOSITION

(76) Inventor: Martin Simpson, O'Fallon, IL (US)

( * ) Notice: Subject to any disclaimer, the term of this patent is extended or adjusted under 35 U.S.C. 154(b) by 0 days.

(21) Appl. No.: 13/005,078

(22) Filed: Jan. 12, 2011

(65) Prior Publication Data
US 2011/0210284 A1 Sep. 1, 2011

Related U.S. Application Data

(60) Provisional application No. 61/294,310, filed on Jan. 12, 2010.

(51) Int. Cl.
C09K 3/18 (2006.01)
(52) U.S. Cl. .................. 252/70; 106/13; 366/2
(58) Field of Classification Search ............ 106/13; 252/70; 366/2
See application file for complete search history.

(56) References Cited

U.S. PATENT DOCUMENTS

| 5,385,688 | A  | * | 1/1995 | Miller et al. ............ 252/73 |
| 5,653,054 | A  | * | 8/1997 | Savignano et al. ......... 47/2 |
| 5,772,912 | A  | * | 6/1998 | Lockyer et al. .......... 252/70 |
| 6,773,622 | B1 | * | 8/2004 | Andrews et al. ......... 252/70 |
| 7,744,686 | B2 | * | 6/2010 | Tochigi et al. .......... 106/13 |

* cited by examiner

Primary Examiner — Anthony Green
(74) Attorney, Agent, or Firm — Polsinelli Shughart PC

(57) ABSTRACT

An anti-icing composition is provided, which comprises methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and water from about 10% to about 35% (v/v). Methods of preparing and using the anti-icing composition are also described.

24 Claims, 4 Drawing Sheets

ANTI-ICING COMPOSITION

RELATED APPLICATIONS

This application claims the benefit of U.S. Provisional Patent Application No. 61/294,310 filed Jan. 12, 2010, the entire contents of which are incorporated herein by reference.

TECHNICAL FIELD

The present disclosure relates generally to anti-icing compositions and more particularly to environmentally low-impact anti-icing compositions suitable for use on a variety of exposed surfaces.

BACKGROUND OF THE INVENTION

Vehicles of all sorts have various surfaces that are subject to icing under cold climactic conditions. In particular, icing of motor vehicle windshields and windows, and of aircraft surfaces can interfere substantially with the safe operation of the vehicle. Motorists in particular have long been burdened with the need to scrape ice off of motor vehicles on which ice has accumulated following exposure of the vehicle to wintry conditions. Scraping as a method of ice removal can be a difficult, tedious and cold job, especially when the ice has accumulated to significant thickness. Various coating compositions have been proposed to reduce ice accumulation on vehicle surfaces exposed to cold, wet weather conditions, and to aid in ice removal. The coatings are applied to exposed surfaces before or during the occurrence of weather conditions conducive to icing, typically work by lowering the melting temperature of ice and preventing the ice from bonding to the expose surface. As a result, ice and snow deposited on the treated surfaces remains soft and slushy, and any remaining on the surface is easily cleared without the need for vigorous scraping. Most of these ant-icing coatings incorporate organic or inorganic chemicals such as resins, silones or salts that are not very environmentally sound. A need therefore exists in the art for improved anti-icing compositions with a reduced impact on the natural environment.

SUMMARY OF THE INVENTION

In one aspect, the present disclosure provides an anti-icing composition comprising: a) methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and $H_2O$ from about 10% to about 35% (v/v). The propylene glycol may be present in an amount from 9.5 to 10.5% (v/v), or preferably from 9.8 to 10.5% (v/v). The vegetable glycerin may be present in an amount from 9.5 to 10.5% (v/v). The isopropyl alcohol (90%) may be present in an amount from 44 to 48% (v/v). The water may be present in an amount from 15 to 29% (v/v), preferably from 20 to 28% (v/v), and more preferably from 25 to 28% (v/v). The anti-icing composition may further comprise xanthan gum. The disclosure also describes a surface coated with the anti-icing composition.

In another aspect the present disclosure provides a method of treating a surface to prevent icing, the method comprising applying to the surface an anti-icing composition comprising methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and $H_2O$ from about 10% to about 35% (v/v). In the above method, the anti-icing composition may comprise propylene glycol from 9.5 to 10.5% (v/v), and preferably from 9.8 to 10.5% (v/v). In the method, the anti-icing composition may comprise vegetable glycerin from 9.5 to 10.5% (v/v). In the method, the anti-icing composition may comprise isopropyl alcohol (90%) from 44 to 48% (v/v). In the method the anti-icing composition may comprise water from 15 to 29% (v/v), preferably from 20 to 28% (v/v), and more preferably from 25 to 28% (v/v). In the method, the anti-icing composition may further comprise xanthan gum.

In another aspect the present disclosure provides a method of making an anti-icing composition comprising methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and $H_2O$ from about 10% to about 35% (v/v), the method comprising: a) titrating isopropyl alcohol (90%) dropwise into an amount of methyl cellulose; b) letting the mixture of a) stand until the solution turns clear; c) titrating dropwise vegetable glycerin into the mixture from b); d) titrating dropwise propylene glycol into the mixture of step c); e) agitating the mixture of step d); f) adding water to the mixture of e), and agitating the resulting mixture until clear. In the method, the anti-icing composition may comprise methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and $H_2O$ from about 10% to about 35% (v/v).

In another aspect the present disclosure provides a method of making an anti-icing composition comprising methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and $H_2O$ from about 10% to about 35% (v/v), the method comprising: a) mixing an amount of isopropyl alcohol (90%) with an amount of water; b) titrating the mixture of a) dropwise into an amount of methyl cellulose; c) letting the mixture of b) stand until the solution turns clear; d) titrating dropwise vegetable glycerin into the mixture from c); e) titrating dropwise propylene glycol into the mixture of step d); f) agitating the mixture of e) until clear. In the method, the anti-icing composition may comprise methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and water from about 10% to about 35% (v/v).

In another aspect the present disclosure provides a method of making an anti-icing composition comprising methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and $H_2O$ from about 10% to about 35% (v/v), the method comprising: a) preparing a solution of the methyl cellulose in a mixed solvent about 50% (v/v) of the isopropyl alcohol and about 75% (v/v) of the water; b) adding the remaining isopropyl alcohol and water to the solution resulting from a); c) letting the mixture of b) stand for a period of at least about 10 minutes to thicken; d) adding the propylene glycol and the vegetable glycerin into the mixture from c) and blending the resulting mixture.

In another aspect the present disclosure provides an anti-icing composition prepared according to any of the above methods.

In another aspect the present disclosure provides a kit for preventing icing on a surface, the kit comprising an anti-icing composition comprising methyl cellulose from about 5 to about 15% (v/v); propylene glycol from about 9 to about 11% (v/v); vegetable glycerin from about 9 to about 11% water (v/v); isopropyl alcohol (90%) from about 42 to about 49% (v/v), and water from about 10% to about 35% (v/v); and an applicator bottle for applying the anti-icing composition to the surface. The kit may further comprise instructions for applying the anti-icing composition to the surface.

DETAILED DESCRIPTION

Figure 1:
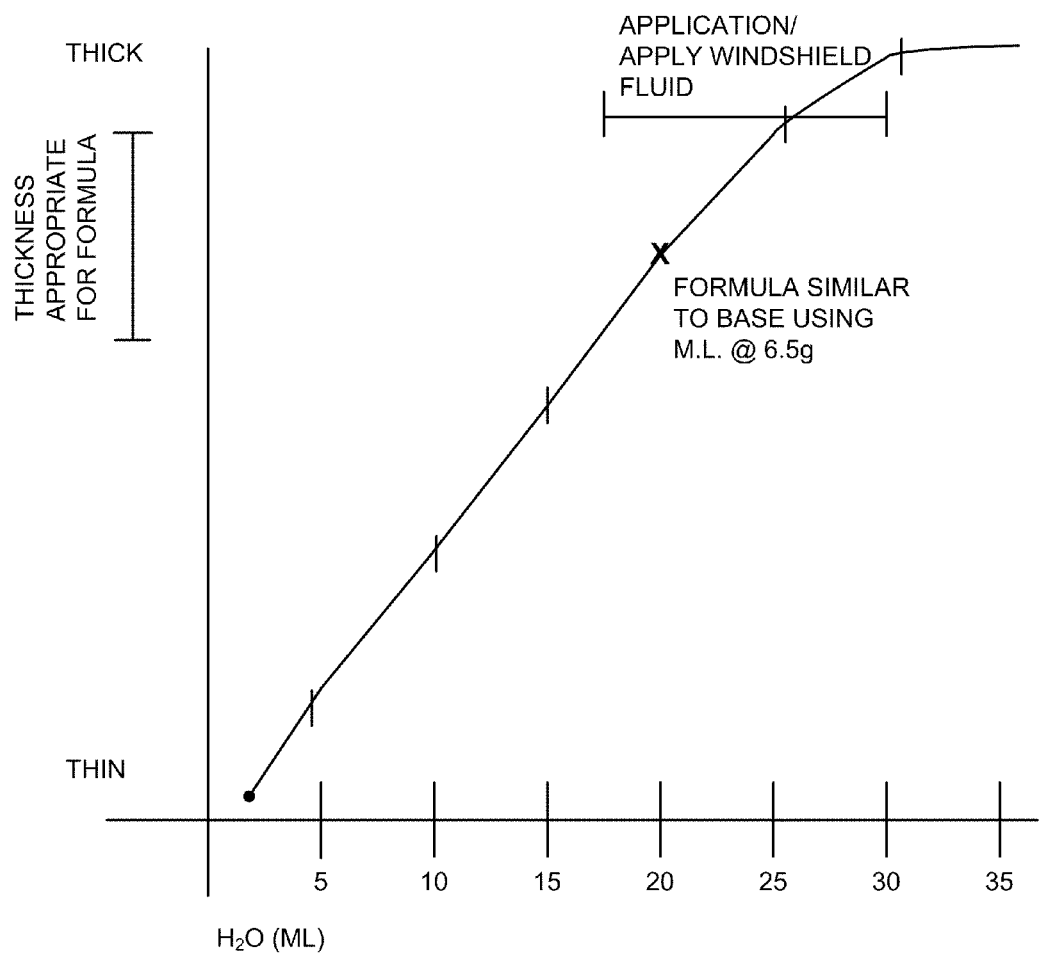
FIG. 1 is a graph of a measure of the relative consistency of an anti-icing composition as a function of amount of water in the composition.

The present disclosure provides an ecologically neutral anti-icing composition made from components with little or no negative impact on the natural environment when made and used as described. The anti-icing composition can be made from a mixture of readily commercially available substances, including methyl cellulose ("MC", www.lineco.com, item number 793-1001), propylene glycol ("prop gly"; //store01.prostores.com/servlet/thescienceshop/the), isopropyl alcohol 90% ("iso"), vegetable glycerin ("veg gly"), and water. Optionally, xanthan gum may be added in amounts suitable to further thicken the composition. The amounts for each component can be varied to adjust the viscosity of the resulting composition appropriately to the intended application and/or outdoor climate. In an exemplary such composition, the relative amounts of each component are as follows (as volume percent of the composition): methyl cellulose from about 5 to about 15%; propylene glycol from about 9 to about 11%, preferably 9.5 to 10.5%, and more preferably 9.8 to 10.5%; vegetable glycerin from about 9 to about 11%, and preferably 9.5 to 10.5%; isopropyl alcohol (90%) from about 42 to about 49%, and preferably 44 to 48%; and water from about 10% to about 35%, preferably 15 to 29%, more preferably 20 to 28%, and still more preferably 25 to 28%.

The viscosity of the resulting composition at any given temperature varies primarily depending on the relative amount of water included. At room temperature, a composition including water at 29% (v/v) is exceedingly thin and watery and may not have the viscosity sufficient to maintain contact with a surface being treated for the time necessary for the composition to take effect. However, a composition at room temperature including water at 27.7% (v/v) bears a consistency comparable to catsup and has sufficient adhesive property to cling to substantially vertical surfaces to which it is applied. Relatively small variations in the relative amount of water in the composition can produce compositions with a wide range of viscosity. Thinner compositions may be better adapted to use in warmer climates, and thicker compositions may be better adapted to use in colder climates. It will be appreciated for example that a trade-off exists between the melting point of the composition, which will be lower with less water (and thus the composition will be more robust in severe cold), and the viscosity of the application and thus resultant ease of application. A thinner composition is more easily applied for example by spray application. Factors other than the prevailing outdoor climate may also influence the choice of viscosity and thus the relative amount of water used.

An exemplary composition can be made by titrating the isopropyl alcohol dropwise into a container containing methyl cellulose, mixing and letting stand for about at least about one to about three hours or until the solution turns clear; then into the resulting mixture, titrating or slowly adding the vegetable glycerin dropwise. Next, the propylene glycol is titrated or added slowly dropwise to the mixture, and the whole is mixed thoroughly using any form of mechanical agitation. For example, the mixture may be simply stirred with a glass stirring rod or similar tool. Optionally, an amount of xanthan gum can be added at this point as a thickener, or substituted 1:1 for the methyl cellulose, with the understanding that any amount of xanthan gum will likely cloud the final composition thus making it less suitable for use on vehicle windshields or other surfaces through which clear viewing may be needed. Depending on the desired viscosity and freezing point of the composition, a volume of water is wherein the volume of water added relative to the volume of the composition resulting from the previous steps is variable and will impact the freezing point of the resulting solution. A suitable composition results when the steps for preparing the composition as detailed above are followed in the order described, and any water is added to the solution resulting from the step of adding the propylene glycol or after the optional addition of xanthan gum. Water is added in an amount as described elsewhere herein. Although it is preferred to follow the sequence of mixing steps as described and add any water at the end, a suitable solution can alternatively be prepared by first combining any water with the alcohol directly, prior to combining the resulting mixture with the remaining components.

Alternatively, an anti-icing composition can be prepared by first preparing a solution of the methyl cellulose in a mixed solvent consisting of about half of the total volume of isopropyl alcohol to be used, and about 75% the total volume of water to be used, and once the methyl cellulose is dissolved, adding the remaining volume of isopropyl alcohol and water to the solution and blending. The resulting solution is then set aside, for example at room temperature, for a period of at least several minutes until the solution thickens to a viscosity judged to be greater than a "thick honey" level of viscosity. Typically the mixture will thicken appropriately in about 10 minutes. The propylene glycol and vegetable glycerin are then added to the mixture and blended in. The resulting mixture is noticeably thinner than the initial methyl cellulose solution, having a viscosity between "medium" and "thick honey" viscosity. Following this method, the methyl cellulose rapidly dissolves, and the resulting solution relatively rapidly thickens following addition of the remaining water and alcohol. Subsequent addition of the propylene glycol and vegetable glycerin then results in a composition having a consistency especially well-suited for spray-on application of the anti-ice composition.

In use, the anti-icing composition is non-toxic and can be readily applied to any surface for which anti-icing protection is desired. In an exemplary embodiment, the composition is fluid and the viscosity of the composition can be readily adjusted so that the final product is sprayable and thus easily applied to a surface. The composition is especially useful for protecting motor vehicle windshields and windows from icing over. Other surfaces to which the anti-icing composition may be usefully applied include any external glass and metal surfaces that are routinely exposed to outside weather conditions that can result in icing over and problems of visibility and function that are associated therewith. For example, it is contemplated that the anti-icing composition can be usefully applied to the external surface of windows of any kind, and external aircraft surfaces including wings. Additionally, as will be appreciated from the ingredients of the composition as set forth herein, the composition is non-toxic and biodegradable and thus is environmentally neutral.

In use, for example in anticipation of freezing weather and icing conditions, the composition is simply applied to a surface, for example to the external surface of a windshield and other vehicle windows. For example, the composition can be suitably packaged in an applicator bottle, such as a spray bottle and application readily achieved by spray application onto the surface(s). In an exemplary embodiment, a suitable spray bottle includes a spray nozzle having a tip having an opening configured in the shape of a star, cross, target crosshairs or the like, so to cause the composition to disperse across a wider surface area when sprayed.

A kit for preventing icing of a surface may include the anti-icing composition together with an applicator bottle such as a spray bottle, and may further include for use. Instructions included in kits of the present disclosure can be affixed to packaging material or can be included as a package insert. While the instructions are typically written or printed materials they are not limited to such. Any medium capable of storing such instructions and communicating them to an end user is contemplated by this disclosure. Such media include, but are not limited to, electronic storage media (e.g., magnetic discs, tapes, cartridges, chips), optical media (e.g., CD ROM), and the like. As used herein, the term "instructions" can include the address of an internet site that provides the instructions.

The composition may also be applied to vehicle door handles and locks to prevent the vehicle doors from freezing shut. When the vehicle is ready to be driven, the previously treated windshield and windows and other surfaces are readily cleared of any remaining ice by merely wiping, for example using the windshield wiper and/or manually using a small scraper or squeegee. Having treated the surfaces, no need exists to run a vehicle defroster for any length of time, nor does the ice require the substantial physical effort of manually scraping to loosen ice that otherwise would be bonded to the untreated surface.

EXAMPLES

By way of example, and not of limitation, examples of the present disclosures shall now be given.

Example 1

The formula listed below is used to prepare an anti-icing composition according to the present disclosure.

| Met Cel | 6.5 g |
| Prop Gly | 7.5 ml |
| Veg Gly | 7.5 ml |
| Iso | 33.5 ml |
| $H_2O$ | 20 ml |

Example 2

The following formula was used to prepare an anti-icing composition (percent as volume %):

| Met Cel | 2 grams | 2.8% |
| Prop Gy | 7.5 ml | 10.7% |
| Veg Gyc | 7.5 ml | 10.7% |
| Iso | 33.5 ml | 48% |
| $H_2O$ | 20 ml | 29% |

Observed to produce a composition having a thin, watery consistency.

Example 3

The following formula was used to prepare an anti-icing composition:

| Met Cel | 4 grams | 5.5% |
| Prop Gy | 7.5 ml | 10.4% |
| Veg Gyc | 7.5 ml | 10.4% |
| Iso | 33.5 ml | 46.5% |
| $H_2O$ | 20 ml | 27.7% |

Observed to produce a composition having a consistency comparable to catsup.

Example 4

The following formula was used to prepare an anti-icing composition:

| Met Cel | 6 grams | 8% |
| Prop Gy | 7.5 ml | 10% |
| Veg Gyc | 7.5 ml | 10% |
| Iso | 33.5 ml | 45.3% |
| $H_2O$ | 20 ml | 27% |

This formula was observed to produce a composition having a consistency comparable to honey.

Example 5

The following formula was used to prepare an anti-icing composition:

| Met Cel | 8 grams | 10.5% |
| Prop Gy | 7.5 ml | 9.8% |
| Veg Gyc | 7.5 ml | 9.8% |
| Iso | 33.5 ml | 44% |
| $H_2O$ | 20 ml | 26% |

This formula was observed to produce a composition having a consistency comparable to honey.

Example 6

The following formula was used to prepare an anti-icing composition:

| | | |
|---|---|---|
| Met Cel | 10 grams | 12% |
| Prop Gy | 7.5 ml | 9.5% |
| Veg Gyc | 7.5 ml | 9.5% |
| Iso | 33.5 ml | 46.5% |
| H₂O | 20 ml | 25.5% |

This formula was observed to produce a composition having a thicker consistency than that of the composition from Example 5

Example 7

The following formula was used to prepare an anti-icing composition:

| | | |
|---|---|---|
| Met Cel | 12 grams | 15% |
| Prop Gy | 7.5 ml | 9% |
| Veg Gyc | 7.5 ml | 9% |
| Iso | 33.5 ml | 42% |
| H₂O | 20 ml | 20% |

This formula was observed to produce a composition having a thicker consistency than that of the composition from Example 6.

Example 8

The amount of water was varied from 2 mL to 40 mL in a composition otherwise prepared according to the formula provided in Example 1. As indicated in FIG. 1, the consistency of the resulting composition was evaluated on a scale of 1 to 10.

Example 9

Figure 2:
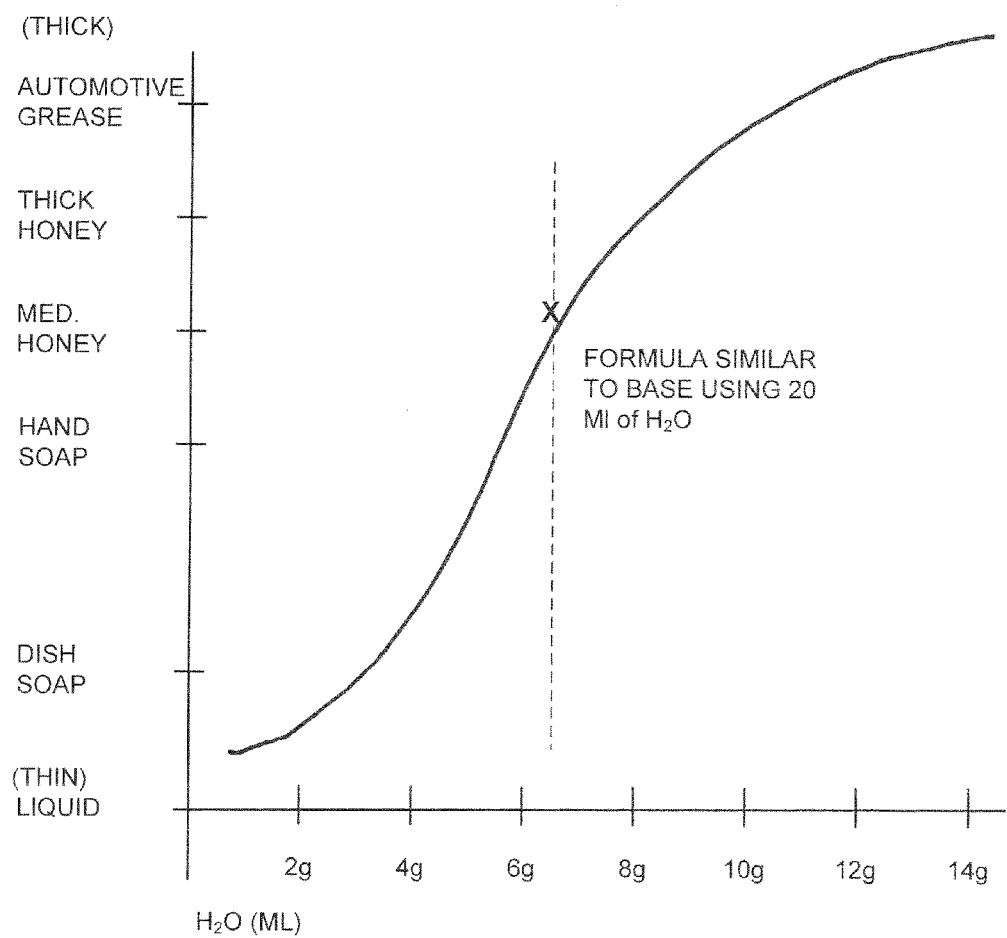
FIG. 2 is a graph of a measure of the relative consistency of an anti-icing composition as a function of amount of methyl cellulose in the composition.

The amount of methyl cellulose was varied from 1 g to 12 g in a Composition otherwise prepared according to the formula provided in Example 1. As indicated in FIG. 2, the consistency of the resulting composition was evaluated on a scale of 1 to 10.

Example 10

Figure 3:
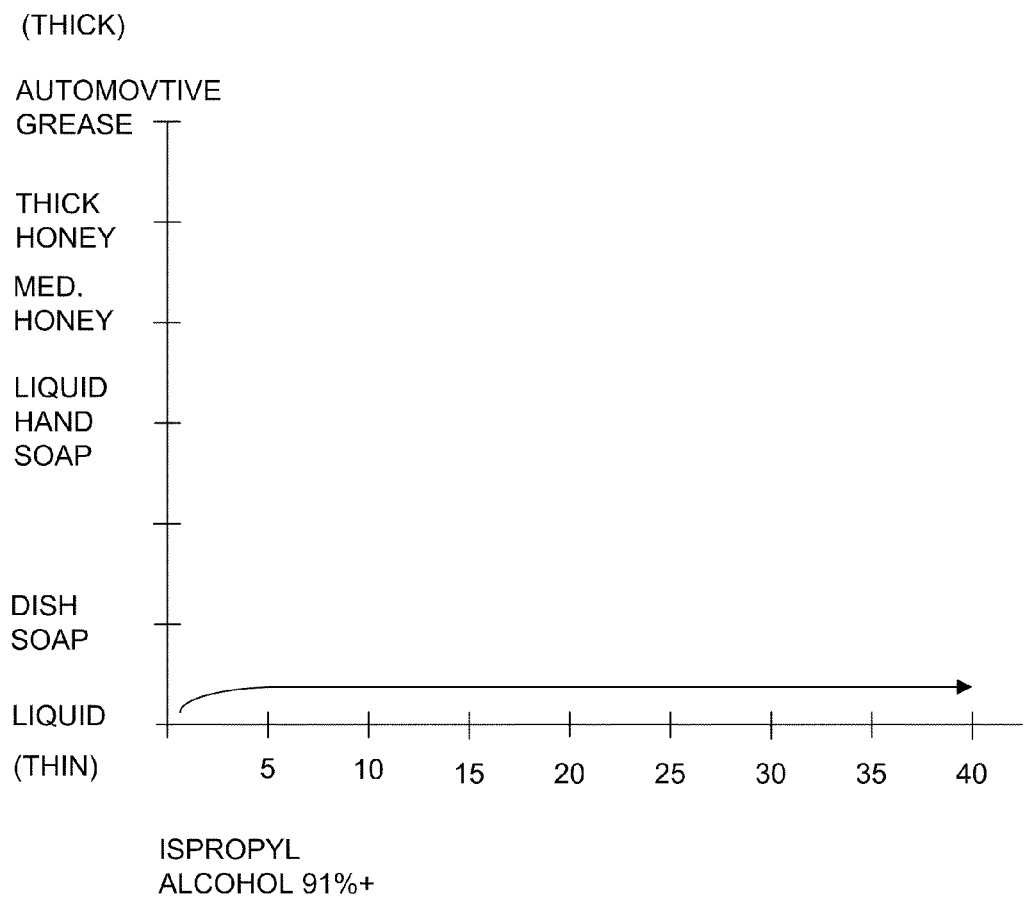
FIG. 3 is a graph of a measure of the relative consistency of an anti-icing composition as a function of amount of isopropyl alcohol in the composition.

The amount of isopropyl alcohol was varied as indicated in FIG. 3 in a composition otherwise prepared according to the formula provided in Example 1. As indicated in FIG. 3, the consistency of the resulting composition was evaluated on a scale of 1 to 10.

Example 11

An anti-ice composition was prepared as follows: a methyl cellulose solution was prepared by dissolving 6.5 g methyl cellulose with 15 ml of isopropyl alcohol (90%) and 15 ml of water until the methyl cellulose dissolved.

Figure 4:
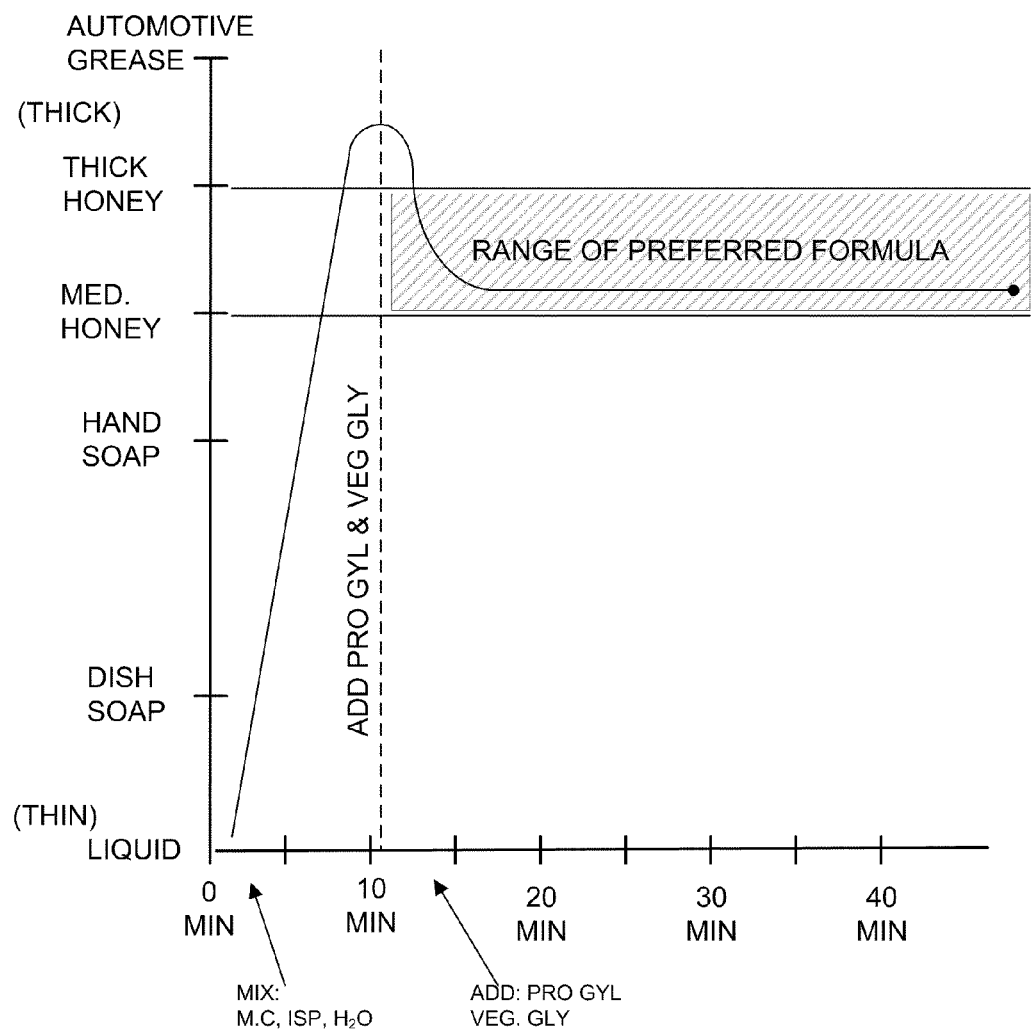
FIG. 4 is a graph of the relative consistency of an anti-icing composition as a function of time following mixing of specified components.

An additional 15.5 ml of isopropyl alcohol and 5 ml of water was added and the mixture stirred until blended. The mixture was set aside for a period of 10 minutes and allowed to thicken to a viscosity judged to be greater than the "thick honey" level of viscosity. Propylene glycol (7.5 ml) was added, and vegetable glycerin added (7.5 ml) to the mixture and blended. The resulting mixture was thinner than the initial solution, having a viscosity between "medium" and "thick honey" viscosity. FIG. 4 is a graph showing level of consistency against time during preparation of the composition, showing consistency following preparation of the methyl cellulose solution in alcohol and water, and then following addition of the propylene glycol and vegetable glycerin. This method was found to provide for a faster and more thorough dissolving of the methyl cellulose, and a rapid thickening of the initial solution. Subsequent addition of the propylene glycol and vegetable glycerin then thins and stabilizes the mixture into a consistency especially well-suited for spray-on application of the anti-ice composition. This formula and process were found to dependably achieve such a consistency.

One skilled in the art would readily appreciate that the anti-icing compositions and methods described in the present disclosure are well adapted to obtain the ends and advantages mentioned, as well as those inherent therein.

All publications mentioned in the specification are indicative of the levels of those skilled in the art to which the present disclosure pertains. All patents and publications are herein incorporated by reference to the same extent as if each individual publication was specifically and individually indicated to be incorporated by reference.

The present disclosure illustratively described herein suitably may be practiced in the absence of any element or elements, limitation or limitations which are not specifically disclosed herein. Thus, for example, in each instance herein any of the terms "comprising," "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the present disclosure claimed. Thus, it should be understood that although the present disclosure has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. An anti-icing composition comprising: a) methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and H₂O from about 10% to about 35% (v/v).

2. The anti-icing composition of claim 1 comprising propylene glycol from 9.5 to 10.5% (v/v).

3. The anti-icing composition of claim 1 comprising propylene glycol from 9.8 to 10.5% (v/v).

4. The anti-icing composition of claim 1 comprising vegetable glycerin from 9.5 to 10.5% (v/v).

5. The anti-icing composition of claim 1 comprising isopropyl alcohol (90%) from 44 to 48% (v/v).

6. The anti-icing composition of claim 1 comprising water from 15 to 29% (v/v).

7. The anti-icing composition of claim 1 comprising water from 20 to 28% (v/v).

8. The anti-icing composition of claim 1 comprising water from 25 to 28% (v/v).

9. The anti-icing composition of claim 1 further comprising xanthan gum.

10. A surface coated with the anti-icing composition of claim 1.

11. A method of treating a surface to prevent icing, the method comprising applying to the surface an anti-icing composition comprising methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and $H_2O$ from about 10% to about 35% (v/v).

12. The method of claim 11 wherein the anti-icing composition comprises propylene glycol from 9.5 to 10.5% (v/v).

13. The method of claim 11 wherein the anti-icing composition comprises propylene glycol from 9.8 to 10.5% (v/v).

14. The method of claim 11 wherein the anti-icing composition comprises vegetable glycerin from 9.5 to 10.5% (v/v).

15. The method of claim 11 wherein the anti-icing composition comprises isopropyl alcohol (90%) from 44 to 48% (v/v).

16. The method of claim 11 wherein the anti-icing composition comprises water from 15 to 29% (v/v).

17. The method of claim 11 wherein the anti-icing composition comprises water from 20 to 28% (v/v).

18. The method of claim 11 wherein the anti-icing composition comprises water from 25 to 28% (v/v).

19. The method of claim 11 wherein the anti-icing composition further comprises xanthan gum.

20. A method of making an anti-icing composition comprising methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and $H_2O$ from about 10% to about 35% (v/v), the method comprising: a) titrating isopropyl alcohol (90%) dropwise into an amount of methyl cellulose to form a mixture; b) letting the mixture of a) stand until the mixture turns clear; c) titrating dropwise vegetable glycerin into the mixture from b); d) titrating dropwise propylene glycol into the mixture of step c); e) agitating the mixture of step d); f) adding water to the mixture of e), and agitating the resulting mixture until clear.

21. A method of making an anti-icing composition comprising methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and $H_2O$ from about 10% to about 35% (v/v), the method comprising: a) mixing the isopropyl alcohol (90%) with the water to form a mixture; b) titrating the mixture of a) dropwise into the methyl cellulose; c) letting the mixture of b) stand until the mixture turns clear; d) titrating dropwise the vegetable glycerin into the mixture from c); e) titrating dropwise propylene glycol into the mixture of step d); f) agitating the mixture of e) until clear.

22. A method of making an anti-icing composition comprising methyl cellulose from about 5 to about 15% (v/v); propylene glycol from about 9 to about 11% (v/v); vegetable glycerin from about 9 to about 11% (v/v); isopropyl alcohol (90%) from about 42 to about 49% (v/v), and $H_2O$ from about 10% to about 35% (v/v), the method comprising: a) preparing a solution of the methyl cellulose in a mixed solvent of about 50% (v/v) of the isopropyl alcohol and about 75% (v/v) of the water; b) adding the remaining isopropyl alcohol and water to the solution resulting from a) to form a mixture; c) letting the mixture of b) stand for a period of at least about 10 minutes to thicken; d) adding the propylene glycol and the vegetable glycerin into the mixture from c) and blending the resulting mixture.

23. An anti-icing composition prepared by a method according to any one of claims 20-22.

24. A kit for preventing icing on a surface, the kit comprising an anti-icing composition according to claim 1, an applicator bottle for applying the anti-icing composition to the surface, and optionally further comprising instructions for applying the anti-icing composition to the surface.

* * * * *